(12) United States Patent
Koskinen (10) Patent No.: US 10,356,686 B2
(45) Date of Patent: Jul. 16, 2019

(54) TRANSMISSION CAPACITY NEGOTIATION BETWEEN BASE STATIONS IN THE EVENT OF A FAILED INTERFACE TO CORE NETWORK FOR WIRELESS NETWORKS

(71) Applicant: NOKIA SOLUTIONS AND NETWORKS OY, Espoo (FI)

(72) Inventor: Henri Markus Koskinen, Espoo (FI)

(73) Assignee: Nokia Solutions and Networks Oy, Espoo (FI)

(*) Notice: Subject to any disclaimer, the term of this patent is extended or adjusted under 35 U.S.C. 154(b) by 197 days.

(21) Appl. No.: 15/028,211

(22) PCT Filed: Oct. 10, 2013

(86) PCT No.: PCT/EP2013/071117
§ 371 (c)(1),
(2) Date: Apr. 8, 2016

(87) PCT Pub. No.: WO2015/051842
PCT Pub. Date: Apr. 16, 2015

(65) Prior Publication Data
US 2016/0255566 A1  Sep. 1, 2016

(51) Int. Cl.
*H04W 36/38* (2009.01)
*H04W 28/02* (2009.01)
(Continued)

(52) U.S. Cl.
CPC ........ *H04W 36/385* (2013.01); *H04W 16/04* (2013.01); *H04W 28/0257* (2013.01);
(Continued)

(58) Field of Classification Search
None
See application file for complete search history.

(56) References Cited

U.S. PATENT DOCUMENTS 9,130,834 B2 * 9/2015 Wegmann ........... H04L 41/0803
2013/0003548 A1   1/2013 Sridhar et al.
(Continued)

FOREIGN PATENT DOCUMENTS

EP   2472998 A1    7/2012
EP   2947912 A1 * 11/2015 ............ H04W 92/20
(Continued)

OTHER PUBLICATIONS

International Search Report and Written Opinion for International Application No. PCT/EP2013/071117, dated Jul. 9, 2014, 9 pages.

*Primary Examiner* — Saba Tsegaye
(74) *Attorney, Agent, or Firm* — Brake Hughes Bellermann LLP (57) ABSTRACT

A technique is provided for sending, by a first base station (BS), a data rate test notification to one or more neighbor BSs, performing, by the first BS, a data rate test between the first BS and the core network, receiving, by the first BS, a data rate reply message from one or more neighbor BSs indicating whether or not the data rate test caused a decrease in the data rate available to the neighbor BS, and reducing, by the first BS, an amount of resources available to the first BS for allocation to one or more bearers if one or more of the data rate reply messages indicate that the data rate test caused a decrease in the data rate available to the neighbor BS.

20 Claims, 5 Drawing Sheets

(51) Int. Cl.
*H04W 36/06* (2009.01)
*H04W 36/28* (2009.01)
*H04W 36/00* (2009.01)
*H04W 16/04* (2009.01)
*H04W 16/10* (2009.01)
*H04W 24/04* (2009.01)
*H04W 92/20* (2009.01)

(52) U.S. Cl.
CPC ....... *H04W 36/0061* (2013.01); *H04W 36/06* (2013.01); *H04W 36/28* (2013.01); *H04W 16/10* (2013.01); *H04W 24/04* (2013.01); *H04W 92/20* (2013.01)

(56) References Cited

U.S. PATENT DOCUMENTS

| | | |
|---|---|---|
| 2013/0035100 A1 | 2/2013 | Murakami |
| 2015/0195706 A1* | 7/2015 | Luft ................. H04W 8/30 370/216 |
| 2017/0339603 A1* | 11/2017 | Qiu ................. H04W 92/045 |

FOREIGN PATENT DOCUMENTS

| | | |
|---|---|---|
| WO | 2011/076266 A1 | 6/2011 |
| WO | 2015/049007 A1 | 4/2015 |

* cited by examiner

TRANSMISSION CAPACITY NEGOTIATION BETWEEN BASE STATIONS IN THE EVENT OF A FAILED INTERFACE TO CORE NETWORK FOR WIRELESS NETWORKS

This application is a national stage entry of PCT Application No. PCT/EP2013/071117, filed Oct. 10, 2013, entitled "TRANSMISSION CAPACITY NEGOTIATION BETWEEN BASE STATIONS IN THE EVENT OF A FAILED INTERFACE TO CORE NETWORK FOR WIRELESS NETWORKS" which is hereby incorporated by reference in its entirety.

TECHNICAL FIELD

This description relates to wireless networks.

BACKGROUND

A communication system may be a facility that enables communication between two or more nodes or devices, such as fixed or mobile communication devices. Signals can be carried on wired or wireless carriers.

An example of a cellular communication system is an architecture that is being standardized by the $3^{rd}$ Generation Partnership Project (3GPP). A recent development in this field is often referred to as the long-term evolution (LTE) of the Universal Mobile Telecommunications System (UMTS) radio-access technology. E-UTRA (evolved UMTS Terrestrial Radio Access) is the air interface of 3GPP's Long Term Evolution (LTE) upgrade path for mobile networks. In LTE, base stations, which are referred to as enhanced Node Bs (eNBs), provide wireless access within a coverage area or cell. In LTE, mobile devices, or mobile stations are referred to as user equipments (UE). LTE has included a number of improvements or developments.

SUMMARY

According to an example implementation, a method may include sending, by a first base station (BS), a data rate test notification to one or more neighbor BSs, performing, by the first BS, a data rate test between the first BS and the core network, receiving, by the first BS, a data rate reply message from one or more neighbor BSs indicating whether or not the data rate test caused a decrease in the data rate available to the neighbor BS, and reducing, by the first BS, an amount of resources available to the first BS for allocation to one or more bearers if one or more of the data rate reply messages indicate that the data rate test caused a decrease in the data rate available to the neighbor BS.

According to another example implementation, an apparatus is provided that includes at least one processor and at least one memory including computer instructions, when executed by the at least one processor, cause the apparatus to: send, by a first base station (BS), a data rate test notification to one or more neighbor BSs, perform, by the first BS, a data rate test between the first BS and the core network; receive, by the first BS, a data rate reply message from one or more neighbor BSs indicating whether or not the data rate test caused a decrease in the data rate available to the neighbor BS, and reduce, by the first BS, an amount of resources available to the first BS for allocation to one or more bearers if one or more of the data rate reply messages indicate that the data rate test caused a decrease in the data rate available to the neighbor BS.

According to another example implementation, a computer program product is provided. The computer program product includes a non-transitory computer-readable storage medium and storing executable code that, when executed by at least one data processing apparatus, is configured to cause the at least one data processing apparatus to perform a method including: sending, by a first base station (BS), a data rate test notification to one or more neighbor BSs, performing, by the first BS, a data rate test between the first BS and the core network, receiving, by the first BS, a data rate reply message from one or more neighbor BSs indicating whether or not the data rate test caused a decrease in the data rate available to the neighbor BS; and reducing, by the first BS, an amount of resources available to the first BS for allocation to one or more bearers if one or more of the data rate reply messages indicate that the data rate test caused a decrease in the data rate available to the neighbor BS.

According to another example implementation, an apparatus may include at least one processor and at least one memory including computer instructions, when executed by the at least one processor, cause the apparatus to: receive, by a second base station (BS), a data rate test notification from a first BS indicating that a data rate test will be performed between the first BS and a core network, determine, by the second BS, whether the data rate test performed by the first BS caused a decrease in a data rate available for allocation by the second BS, and send, by the second BS, a data rate reply message to the first BS indicating whether or not the data rate test caused a decrease in the data rate available to the second BS.

According to another example implementation, a computer program product is provided that includes a non-transitory computer-readable storage medium and storing executable code that, when executed by at least one data processing apparatus, is configured to cause the at least one data processing apparatus to perform a method including: receiving, by a second base station (BS), a data rate test notification from a first BS indicating that a data rate test will be performed between the first BS and a core network, determining, by the second BS, whether the data rate test performed by the first BS caused a decrease in a data rate available for allocation by the second BS, and sending, by the second BS, a data rate reply message to the first BS indicating whether or not the data rate test caused a decrease in the data rate available to the second BS.

According to another example implementation, a method may include receiving, by a second base station (BS), a data rate test notification from a first BS indicating that a data rate test will be performed between the first BS and a core network, determining, by the second BS, whether the data rate test performed by the first BS caused a decrease in a data rate available for allocation by the second BS, and sending, by the second BS, a data rate reply message to the first BS indicating whether or not the data rate test caused a decrease in the data rate available to the second BS.

The details of one or more implementations are set forth in the accompanying drawings and the description below. Other features will be apparent from the description and drawings, and from the claims.

DETAILED DESCRIPTION

In some cases, a S1 interface between a base station and core network may fail, such as during a natural disaster, equipment failure, or other condition. According to an example implementation, the S1 interface may be re-established over a different physical path that at least partially overlaps or shares one or more network resources with a S1 interface for a neighbor BS. This sharing of network resources for the S1 interfaces may limit the amount of resources (e.g., transmission capacity or available data rate) that may be allocated to bearers at one or both BSs. Therefore, according to an illustrative implementation, a communication or handshaking is provided between BSs to allow at least a first BS to reduce its available amount of resources or data rate for allocation if the operation of the first BS impacts (or decreases) the available resources for another BS, for example.

According to an example implementation, a technique is provided for sending, by a first base station (BS), a data rate test notification to one or more neighbor BSs in response to detecting a re-establishment of a failed interface between the first BS and a core network (first BS-core network interface), performing, by the first BS, a data rate test between the first BS and the core network, receiving, by the first BS, a data rate reply message from one or more neighbor BSs indicating whether or not the data rate test caused a decrease in the data rate (or resources or transmission capacity) available to the neighbor BS, and reducing, by the first BS, an amount of resources available to the first BS for allocation to one or more bearers if one or more of the data rate reply messages indicate that the data rate test caused a decrease in the data rate available to the neighbor BS.

Figure 1:
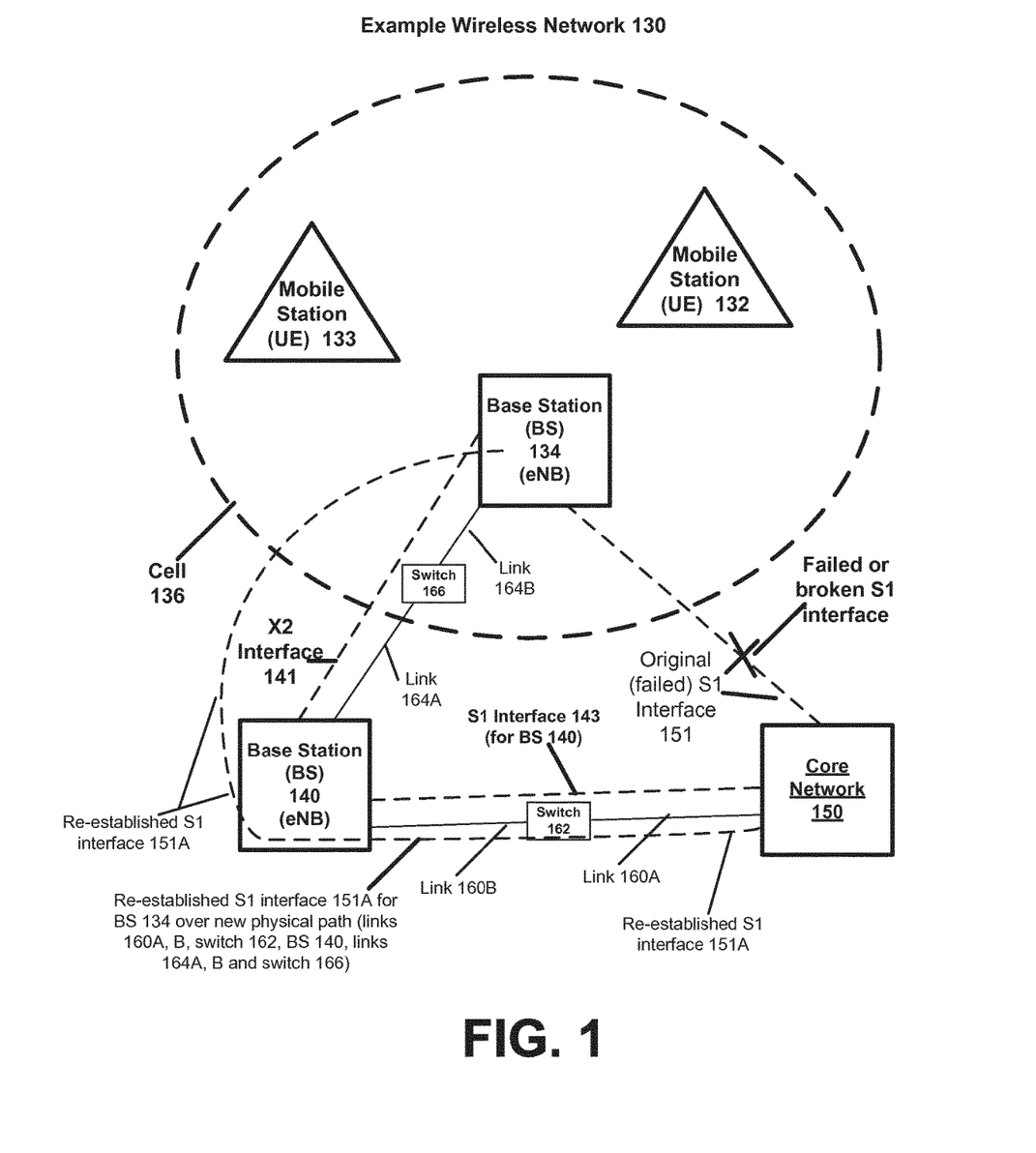
FIG. 1 is a block diagram of a wireless network 130 according to an example implementation.

FIG. 1 is a block diagram of a wireless network 130 according to an example implementation. In the wireless network 130 of FIG. 1, mobile stations (MSs) 132 and 133, which may also be referred to as user equipments (UEs), may be connected (and in communication) with a base station (BS) 134, which may also be referred to as an enhanced Node B (eNB). BS 134 provides wireless coverage within a cell 136. Although only two MSs are shown within cell 136 (connected or attached to BS 134), any number of MSs may be provided. BS 134 is also connected to a core network 150 via a S1 interface 151 (an example of a BS-core network interface). This is merely one simple example of a wireless network, and others may be used.

BS 134 may also be connected to BS 140 via X2 interface 141. BS 140 may also be connected to core network 150 via S1 interface 143. The S1 and X2 interfaces may be logical interfaces provided over physical paths that may include one or more network resources, such as data links, switches (or routers), other BSs, etc. For example, the S1 interface 143 (for BS 140) may be a logical interface provided over a physical path that may include, for example, data links 160A and 160B, and switch 162. X2 interface 141 may be a logical interface provided over a physical path that may include, for example, data links 164A and 164B, and switch 166. S1 interface 151 may similarly be a logical interface between BS 134 and core network 150, and may be provided over a physical path that may include one or more network resources.

In LTE, core network 150 may be referred to as Evolved Packet Core (EPC), which may include a mobility management entity (MME) which may handle or assist with mobility/handover of MSs between BSs, one or more gateways that may forward data and control signals between the BSs and packet data networks or the Internet, and other control functions or blocks. Only a few of the blocks or functions of the example core network are described, and the core network 150 may include different and/or additional blocks/functions, for example.

In some situations, the S1 interface 151 (or BS-core network interface or link) may fail or break, which interrupts or prevents transmission of data between the BS and the core network 150. A failed or broken S1 interface may occur due to a variety of circumstances, such as natural disasters (e.g., earthquakes, hurricane or storm), war, failure of power company infrastructure, or other crisis or emergency. These are merely some example situations where a failed S1 interface is likely to occur, but there may be other situations as well. As one illustrative example, a disaster or other problem may cause a failure of one or more of the underlying network resources of the physical path used by the S1 interface 151, which may result in a failure or breakage of the S1 interface. When the S1 interface fails, packets or data from the core network 150 will no longer be received by the BS 134, and BS 134 is unable to send or forward data or other signals to the core network 150.

According to an example implementation, after failure of S1 interface 151, e.g., due to failure of one or more underlying network resources for the physical path of the S1 interface 151, the various network resources, e.g., switches, routers, core network 150, BSs, may re-establish the S1 interface via a new physical path. In an example illustrative implementation, the re-established S1 interface 151A may, for example, be provided over a physical path that may include: link 160A, switch (or router) 162, link 160B, BS 140, link 164A, switch (or router) 166, and link 164B. This is merely an example new physical path for the re-established S1 interface 151A. For example, routing tables associated with BS 134 may be updated, according to known routing algorithms, to reflect a new physical path for the re-established S1 interface 151A.

Therefore, as shown in the illustrative example of FIG. 1, the re-established S1 interface 151A may include a physical path that may share one or more network resources with the S1 interface 143 for BS 140. For example, the network resources that may be shared by both the re-established S1 interface 151A and S1 interface 143 may include BS 140, link 160B, switch (or router) 162 and link 160A. This is merely an example, and other network configurations and physical paths may be used. For example, during periods of high traffic, these shared network resources may create a bottleneck or limitation on the amount of traffic that may be transmitted and received.

The network resources along any physical path may include a limited capacity or limited data rate, for example. As a result, the operation of both the re-established interface 151A and the S1 interface 143 over physical paths that at least partially overlap or share one or more network resources may, at least in some cases, decrease the amount of resources, transmission capacity or data rate that may be allocated to connections or bearers by each BS 134, 140. For example, BS 134 and 140 may each allocate available resources or available data rate to a new guaranteed bit rate (GBR) bearer for a new connection if there is sufficient resources available. Once the available data rate/resources have been allocated for connections or bearers (e.g., GBR bearers), the BS may typically not establish new GBR bearers unless one or more other existing bearers are dropped or pre-empted.

As noted above, as a result of the failure of the original S1 interface 151, the re-established S1 interface 151A may now share one or more resources with an S1 interface of another neighbor BS (e.g., BS 140 in this example). This sharing of network resources for their S1 interfaces may limit the amount of resources or available data rate that may be allocated to bearers, e.g., to GBR bearers. Therefore, according to an illustrative implementation, a communication or handshaking is provided between BSs 134 and 140 to allow one or both BSs to reduce their available amount of resources or data rate for allocation if the operation of the other BS impacts (or decreases) the available resources. According to an example implementation, BS 134 may perform a data rate (or speed) test (or operational test or network load test) towards core network over its re-established S1 interface 151A. The operation of this speed test may provide an operational load over the re-established S1 interface 151A for a short period of time. During this data rate test, the BS 140 may measure the resources or data rate available to BS 140, e.g., in order to determine if the operation of BS 134 over re-established S1 interface 151A (which shares one or more network resources with S1 interface 143) negatively impacts, e.g., decreases, the amount of resources or data rate that is available to the BS 140 for allocation. Further details are described below with reference to the illustrative example of FIG. 2.

Figure 2:
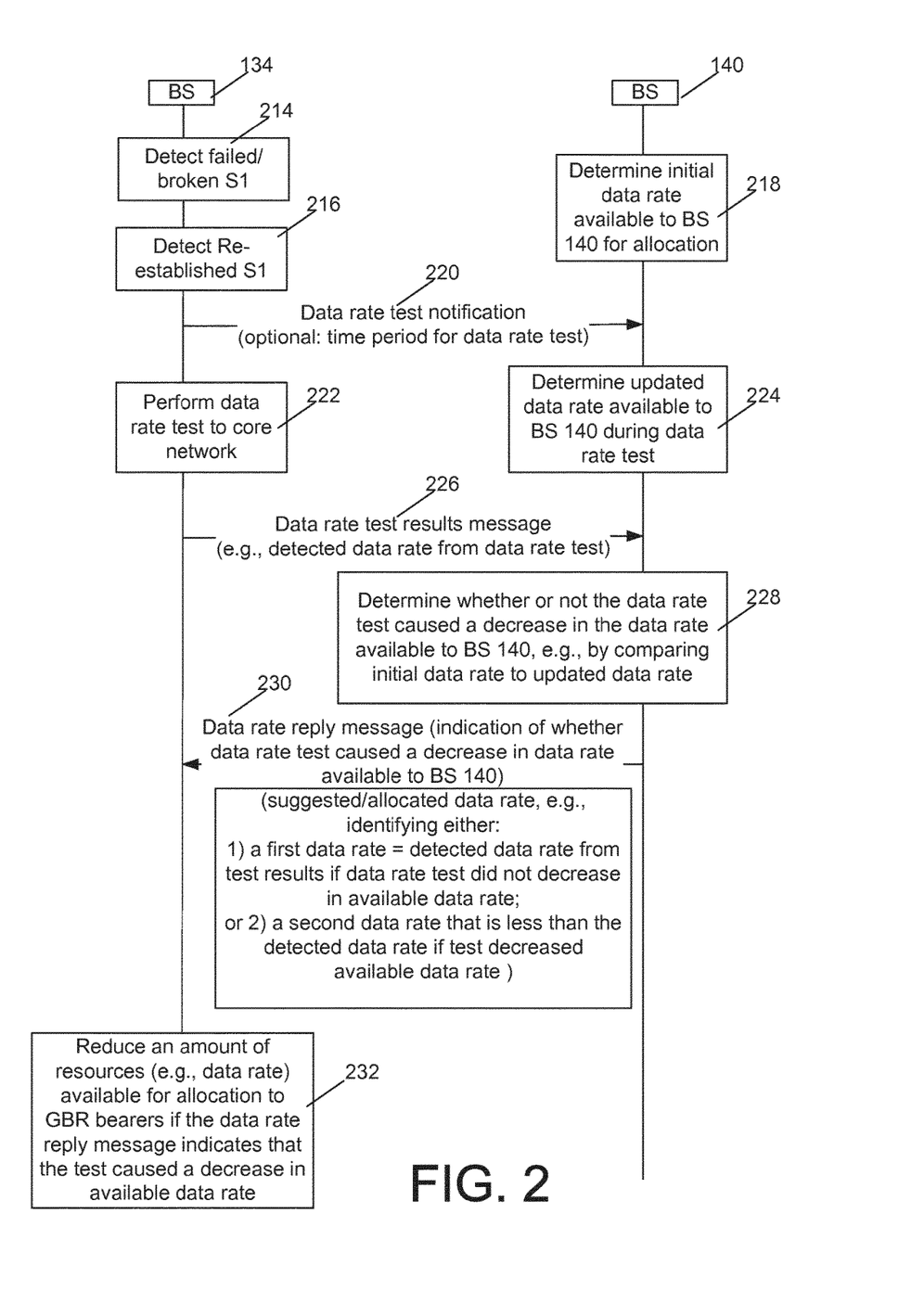
FIG. 2 is a diagram illustrating operation of base stations to perform a transmission capacity negotiation according to an illustrative example implementation.

FIG. 2 is a diagram illustrating operation of base stations to perform a transmission capacity negotiation according to an illustrative example implementation.

At 214, BS 134 detects a failure of a S1 interface 151 to the core network, which may be more generally referred to as the BS-core network interface. This breakage or failure of the S1 interface (or link or connection) may be detected, for example, by the BS 134 detecting an expiration of a re-transmission timer, or failure of the core network 150 to provide an expected signal or acknowledgement to BS 134 within a certain time period, or other condition indicating the failure of the S1 interface or link between the BS 134 and the core network. Also, MSs 132, 133 that are connected to BS 134 within the cell 136 (FIG. 1), may also be in communication with the core network 150, e.g., to receive data. Therefore, a MS, such as MS 132 (FIG. 1) may similarly detect a non-responsive core network 150, and may report this information to BS 134 as a failed S1 interface. These are merely some examples, and other techniques may be used to detect a failed S1 interface 151.

At 216, BS 134 detects that its S1 interface (between BS 134 and core network 150) has been re-established as S1 interface 151A. BS 134 may or may not know that the re-established S1 interface 151A is provided over a new physical path, which overlaps at least a portion of the physical path for (and shares one or more network resources with) S1 interface 143 for BS 140. In one example implementation, BS 134 merely detects the re-establishment of S1 interface but does not know the physical path for such S1 interface 151A, nor that some network resources may be shared with S1 interface 143 for BS 140. In another example implementation, BS 134 receives an indication that S1 interface 151A is provided over a new physical path and/or that S1 interface is provided over network resources that are shared with the S1 interface 143 or the X2 interface 141. In this example shown in FIG. 1, the re-established S1 interface 151 is provided over a physical path that at least partially overlaps or shares network resources with both S1 interface 143 and X2 interface 141. This is merely one example implementation used for illustrative purposes, and other implementations may be used.

At 218, according to an example implementation, BS 140 may have been configured with an amount of resources (e.g., data rate) that are available to BS 140 for allocation to connections or bearers, e.g., resources/data rate available for allocation to guaranteed bit rate (GBR) bearers. Alternatively, a data rate test may be performed by BS 140, or BS 140 may request this information (resources/data rate available for allocation by BS 140) from core network 150, or other technique may be used to determine the initial data rate or initial resources that are available to BS 140 for allocation to bearers or connections.

In response to detecting the re-establishment of a failed S1 interface between BS 134 and core network, BS 134 sends a data rate test notification 220 to notify each of one or more neighbor BSs, including BS 140, that BS 134 is (or will be) performing a data rate test (or network loading test to stress or load the S1 interface 151A) for a short period of time. Although not required, data rate test notification may identify a time period for the data rate test. Alternatively, the time period for the data rate test may be defined as including all or at least a portion of the time period between data rate test notification 220 and data rate test results message 226, discussed below.

At 222, BS 134 performs a data rate test (or speed test) or a network loading test via the S1 interface 151 to the core network 150. A number of different techniques may be used to perform a data rate (or speed) test. According to one example implementation, BS 134 may send (and/or receive) a test file to (from) a gateway (or other entity) within the core network 150 and measure the amount of time it takes to transmit the file. After receiving the test file, the gateway or core network may send one or more acknowledgements to BS 134 to acknowledge receipt of the test file. The data rate over the S1 interface 151 to core network may be calculated, for example, as: size of test file/time for transmission. This is merely one example of a data rate test, and many other data rate tests or network loading tests may be used.

At 224, the BS 140 determines an updated data rate available to BS 140 during the data test. Different techniques may be used to determine the updated data rate available to the BS 140. For example, a data rate test may be performed by BS 140, e.g., at the same time, or overlapping, when BS 134 is performing a data rate test.

Next, the BS 134 sends a data rate test results message 226 to BS 140 to report the results of the data test performed at 222. Data rate test results message 226 may identify, for example, the detected data rate from the data rate test (222).

At 228, the BS 140 determines whether or not the data rate test performed by BS 134 caused a decrease in the data rate or amount of resources available to BS 140. For example, BS 140 may compare the initial data rate (or amount of resources) available to the BS 140 determined at 218 to the updated data rate/amount of resources available to the BS 140 determined at 224 during the data rate test. This comparison may indicate whether the data rate test causes a decrease in the resources/data rate available to BS 140 for allocation while BS 134 is loading or transmitting data via its S1 interface 151A. For example, if the updated data rate is less than the initial data rate, then this indicates that the data rate test negatively impacts or decreases the resources (e.g., data rate or transmission capacity) available to BS 140 as a result of the transmission of data via re-established S1 interface 151A by BS 134.

At 230, BS 140 sends a data rate reply message to BS 134 that includes one or more fields indicating whether or not the data rate test caused a decrease in the amount of resources or data rate available to BS 140. According to a first example implementation, the data rate reply message 230 may include a suggested/allocated data rate set to: 1) a first data rate equal to the detected data rate from the data rate test results if the data rate test did not cause a decrease in the amount of resources or data rate available to BS 140; or 2) a second data rate that is less than the detected data rate from the data rate if the test caused a decrease in the amount of resources/data rate available to BS 140. For example, the suggested/allocated data rate may be determined based on the detected data rate from the data rate test and the amount of decrease in amount of resources or data rate detected by BS 140 during the data rate test. For example, an suggested/ allocated data rate field may be set to: the detected data rate from data rate test possibly subtracted by a data rate decrease detected by BS 140 during the test.

As another example, the suggested/allocated data rate field within data rate reply message 230 may simply include a delta (or difference value) that the BS 134 should subtract from the data rate detected by BSS 134 during the data rate test. Such delta may be set to the amount of decrease in resources or data rate detected by BS 140 during the data rate test, for example.

At 232, BS 134 may reduce an amount of resources or data rate available to BS 134 to allocate to connections or bearers (e.g., for allocation to GBR bearers) if the data rate reply message 230 indicates that the data rate test caused a decrease in available data rate for BS 140. According to one example implementation, the BS 134 may decrease its data rate/amount of resources to the suggested/allocated data rate provided in the data rate reply message. Alternatively, BS 134 may establish a new/adjusted data rate for allocation by decreasing its data rate or amount of resources for allocation by the delta (or difference value) that may have been provided within the suggested/allocated data rate field of the data rate reply message. These are merely some examples of how the BS 134 may adjust or decrease its data rate or amount of resources available for allocation to one or more bearers (e.g., GBR bearers) based on the data rate reply 230, and other techniques may be used.

The operation of one neighbor BS, BS 140, has been described above. A similar process may be performed by each of several other neighbor BSs. For example, each neighbor BS may receive a data rate test notification 220, determine an updated data rate at 224 during the data rate test, determine at 228 whether the data rate test caused a decrease in the data rate available to the neighbor BS for allocation, and send a data rate reply message 230 that indicates whether or not the data rate test caused a decrease in the amount of resources or data rate available at the neighbor BS. BS 134 may then receive each of the data rate reply messages, and may, for example, adjust its data rate or amount of resources available for allocation to bearers based on the data rate reply message that indicated the largest decrease in data rate/resources detected by the neighbor BS during the test.

Figure 3:
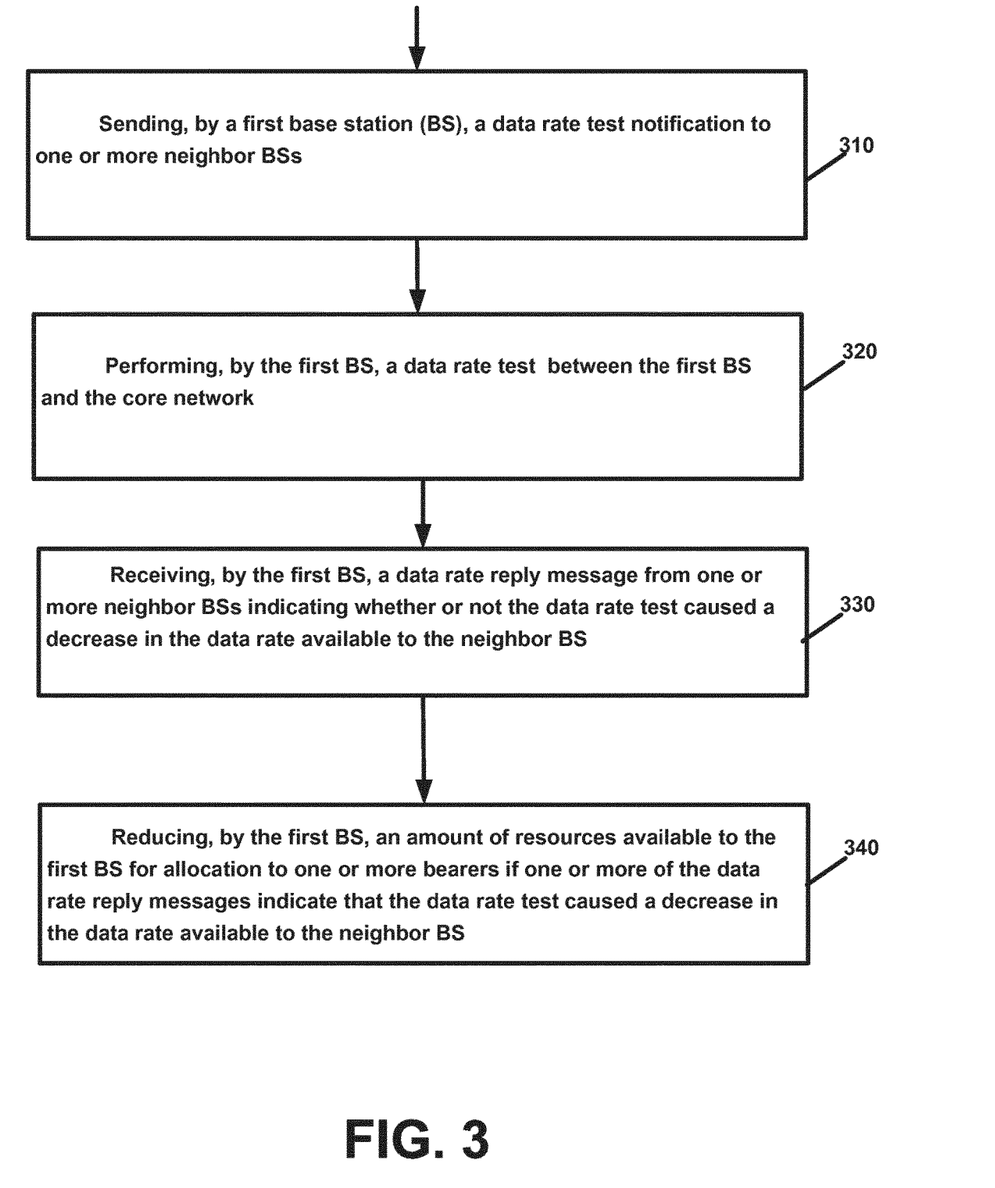
FIG. 3 is a flow chart illustrating operation of a base station (BS) according to an example implementation.

FIG. 3 is a flow chart illustrating operation of a base station (BS) according to an example implementation. Operation 310 includes sending, by a first base station (BS), a data rate test notification to one or more neighbor BSs. Operation 320 includes performing, by the first BS, a data rate test between the first BS and the core network. Operation 330 includes receiving, by the first BS, a data rate reply message from one or more neighbor BSs indicating whether or not the data rate test caused a decrease in the data rate available to the neighbor BS. Operation 340 includes reducing, by the first BS, an amount of resources available to the first BS for allocation to one or more bearers if one or more of the data rate reply messages indicate that the data rate test caused a decrease in the data rate available to the neighbor BS.

According to an example implementation, in the method of FIG. 3, the sending may include sending, by a first base station (BS), a data rate test notification to one or more neighbor BSs in response to detecting a re-establishment of a failed interface between the first BS and a core network (first BS-core network interface).

According to an example implementation, in the method of FIG. 3, the data rate test notification identifies a time period for the data rate test to be performed.

According to an example implementation, in the method of FIG. 3, the first BS-core network interface includes a S1 interface between the first BS and the core network.

According to an example implementation, in the method of FIG. 3, the re-established first BS-core network interface is re-established over a physical path that shares one or more network resources with an interface (e.g., S1 interface) between a second BS and the core network, the neighbor BSs including the second BS.

According to an example implementation, in the method of FIG. 3, the re-established first BS-core network interface is re-established over a physical path which shares one or more network resources with an interface (e.g., X2 interface) between the first BS and a second BS, the neighbor BSs including the second BS.

According to an example implementation, in the method of FIG. 3, the sending, by a first base station (BS), a data rate test notification may include: detecting, by a first base station (BS), a failure of the first BS-core network interface, and determining that the failed first BS-core network interface has been re-established, the re-established first BS-core network interface being re-established over a physical path that shares one or more network resources with an interface between a second BS and the core network, the neighbor BSs including the second BS, and sending, by the first BS, the data rate test notification to the one or more neighbor BSs in response to the determining that the first BS-core network interface has been re-established.

According to an example implementation, in the method of FIG. 3, the data rate reply message from one or more neighbor BSs includes a data rate reduction field that indicates a data rate that should be subtracted from the amount of resources available to the first BS to allocate to one or more bearers.

According to an example implementation, the method of FIG. 3 may further include sending, by the first BS to one or more neighbor BSs, a data rate test results message to report the results of the data rate test, wherein the data rate test is performed by the first BS between the sending of the one or more data rate test notifications and the sending of the data rate test results report.

According to an example implementation, the method of FIG. 3 may further include sending, by the first BS to one or more neighbor BSs, a data rate test results message to report the results of the data rate test, wherein the data rate reply message from one or more neighbor BSs includes an allocated data rate for the first BS to allocate to guaranteed bit rate (GBR) bearers, the allocated data rate including at least one of: a first data rate indicated in the data rate test results message that identifies a data rate detected for the data rate test performed between the first BS and the core network if the data rate test did not cause a decrease in the data rate available to the neighbor BS; or a second data rate that is less than the data rate indicated in the data rate test results message if the data rate test caused a decrease in the data rate available to the neighbor BS.

According to an example implementation, in the method of FIG. 3, the second data rate may be based on the first data rate indicated in the data rate test result report and the data rate decrease observed by the neighbor BS during the data rate test.

According to an example implementation, in the method of FIG. 3, the second data rate is the first data rate indicated in the data rate test result report minus the data rate decrease observed by the neighbor BS during the data rate test.

According to another example implementation, an apparatus is provided that includes at least one processor and at least one memory including computer instructions, when executed by the at least one processor, cause the apparatus to: send, by a first base station (BS), a data rate test notification to one or more neighbor BSs, perform, by the first BS, a data rate test between the first BS and the core network; receive, by the first BS, a data rate reply message from one or more neighbor BSs indicating whether or not the data rate test caused a decrease in the data rate available to the neighbor BS; and reduce, by the first BS, an amount of resources available to the first BS for allocation to one or more bearers if one or more of the data rate reply messages indicate that the data rate test caused a decrease in the data rate available to the neighbor BS.

According to another example implementation, a computer program product is provided. The computer program product includes a non-transitory computer-readable storage medium and storing executable code that, when executed by at least one data processing apparatus, is configured to cause the at least one data processing apparatus to perform a method including: sending, by a first base station (BS), a data rate test notification to one or more neighbor BSs, performing, by the first BS, a data rate test between the first BS and the core network, receiving, by the first BS, a data rate reply message from one or more neighbor BSs indicating whether or not the data rate test caused a decrease in the data rate available to the neighbor BS; and reducing, by the first BS, an amount of resources available to the first BS for allocation to one or more bearers if one or more of the data rate reply messages indicate that the data rate test caused a decrease in the data rate available to the neighbor BS.

Figure 4:
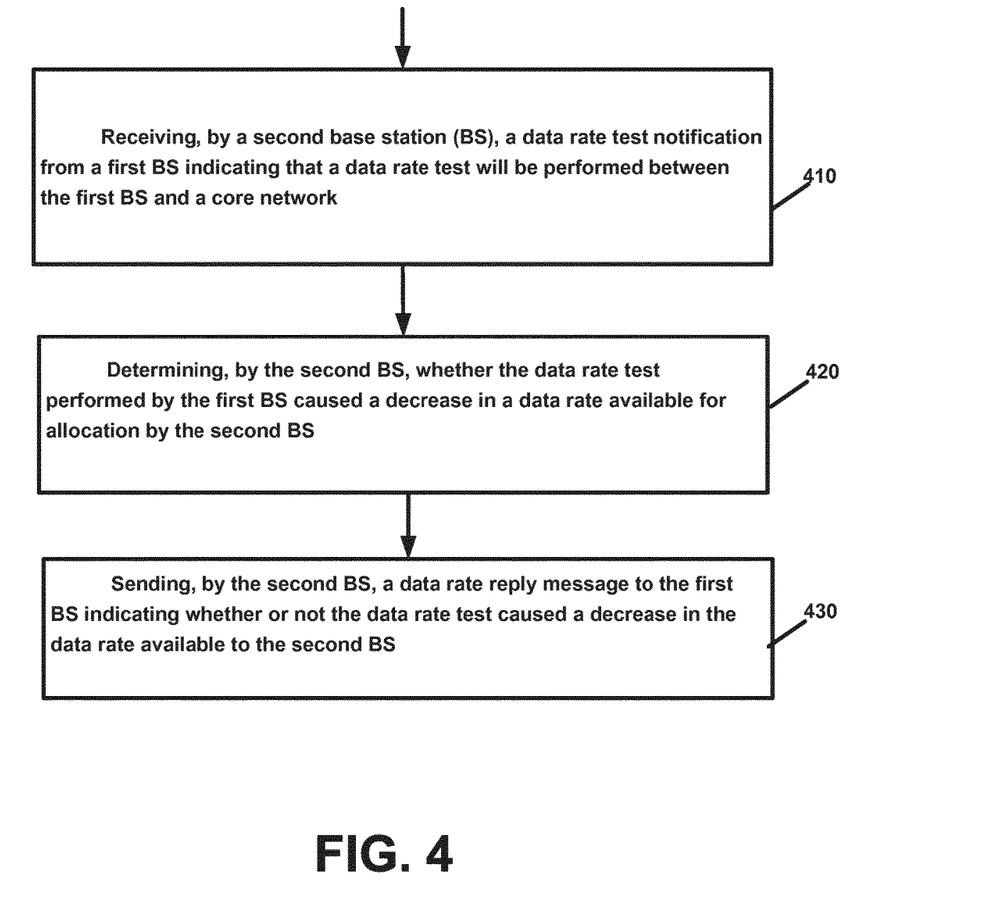
FIG. 4 is a flow chart illustrating operation of a base station according to another example implementation.

FIG. 4 is a flow chart illustrating operation of a base station (BS) according to another example implementation. Operation 410 includes receiving, by a second base station (BS), a data rate test notification from a first BS indicating that a data rate test will be performed between the first BS and a core network. Operation 420 includes determining, by the second BS, whether the data rate test performed by the first BS caused a decrease in a data rate available for allocation by the second BS. Operation 430 includes sending, by the second BS, a data rate reply message to the first BS indicating whether or not the data rate test caused a decrease in the data rate available to the second BS.

According to an example implementation, in the method of FIG. 4, the receiving may include receiving, by a second base station (BS), a data rate test notification from a first BS indicating that a data rate test will be performed over a S1 interface between the first BS and a core network, wherein a physical path of the S1 interface between the first BS and the core network shares one or more network resources with a physical path for a S1 interface between the second BS and the core network.

According to an example implementation, the method of FIG. 4 may further include receiving, by the second BS, a data rate test results message to the first BS.

According to an example implementation, in the method of FIG. 4, the data rate reply message may include a data rate reduction field that indicates a data rate that should be subtracted from an amount of resources available to the first BS for allocation.

According to an example implementation, in the method of FIG. 4, the data rate reply message may include an allocated or suggested data rate for the first BS to allocate to guaranteed bit rate (GBR) bearers, the allocated or suggested data rate including at least one of: a first data rate indicated in the data rate test results message that identifies a data rate detected for the data rate test performed between the first BS and the core network if the data rate test did not cause a decrease in the data rate available to the second BS, or a second data rate that is less than the data rate indicated in the data rate test results message if the data rate test caused a decrease in the data rate available to the second BS.

According to an example implementation, in the method of FIG. 4, the sending, by the second BS, a data rate reply message may include: comparing a data rate available at the second BS before the data rate test to a data rate available at the second BS during the data rate test, determining whether or not the data rate test caused a decrease in the data rate available to the second BS, and sending, by the second BS, a data rate reply message to the first BS indicating whether or not the data rate test caused a decrease in the data rate available to the second BS.

According to another example implementation, an apparatus may include at least one processor and at least one memory including computer instructions, when executed by the at least one processor, cause the apparatus to: receive, by a second base station (BS), a data rate test notification from a first BS indicating that a data rate test will be performed between the first BS and a core network, determine, by the second BS, whether the data rate test performed by the first BS caused a decrease in a data rate available for allocation by the second BS, and send, by the second BS, a data rate reply message to the first BS indicating whether or not the data rate test caused a decrease in the data rate available to the second BS.

According to another example implementation, a computer program product is provided that includes a non-transitory computer-readable storage medium and storing executable code that, when executed by at least one data processing apparatus, is configured to cause the at least one data processing apparatus to perform a method including: receiving, by a second base station (BS), a data rate test notification from a first BS indicating that a data rate test will be performed between the first BS and a core network, determining, by the second BS, whether the data rate test performed by the first BS caused a decrease in a data rate available for allocation by the second BS, and sending, by the second BS, a data rate reply message to the first BS indicating whether or not the data rate test caused a decrease in the data rate available to the second BS.

Figure 5:
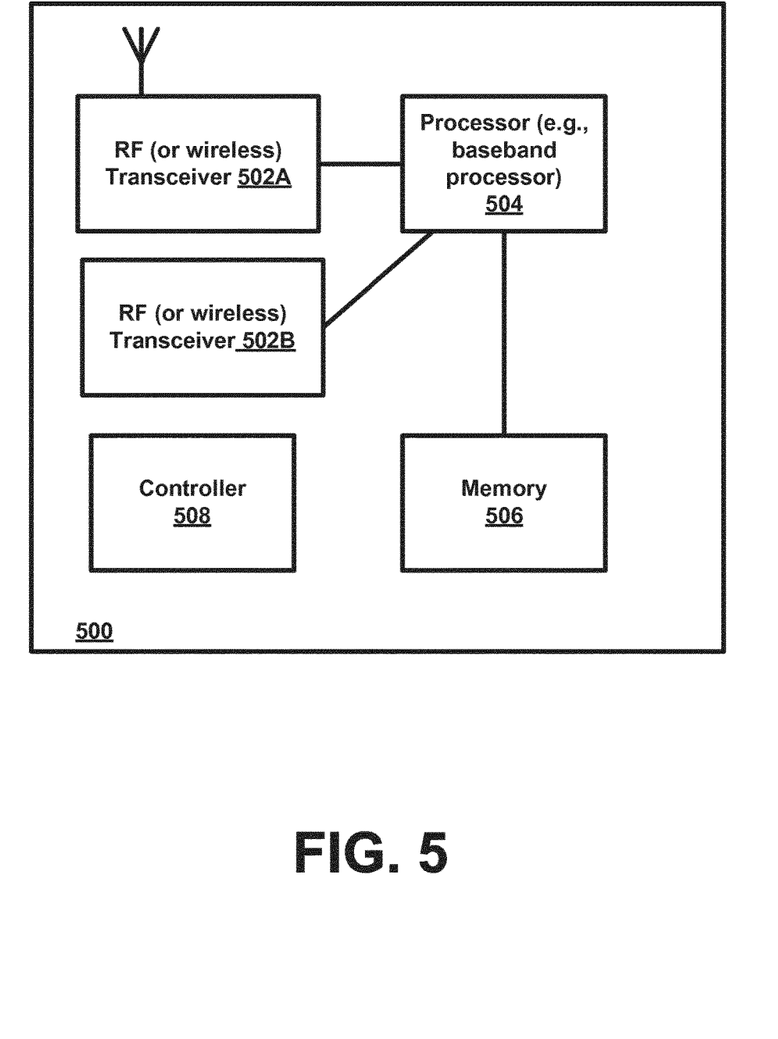
FIG. 5 is a block diagram of a wireless station (e.g., BS or MS) 500 according to an example implementation.

FIG. 5 is a block diagram of a wireless station (e.g., BS or MS) 500 according to an example implementation. The wireless station 500 may include, for example, two RF (radio frequency) or wireless transceivers 502A, 502B, where each wireless transceiver includes a transmitter to transmit signals and a receiver to receive signals. The wireless station also includes a processor 504 to execute instructions or software and control transmission and receptions of signals, and a memory 506 to store data and/or instructions.

Processor 504 may also make decisions or determinations, generate frames, packets or messages for transmission, decode received frames or messages for further processing, and other tasks or functions described herein. Processor 504, which may be a baseband processor, for example, may generate messages, packets, frames or other signals for transmission via wireless transceiver 502. Processor 504 may control transmission of signals or messages over a wireless network, and may receive signals or messages, etc., via a wireless network (e.g., after being downconverted by wireless transceiver 502, for example). Processor 504 may be programmable and capable of executing software or other instructions stored in memory or on other computer media to perform the various tasks and functions described above, such as one or more of the tasks or methods described above. Processor 504 may be (or may include), for example, hardware, programmable logic, a programmable processor that executes software or firmware, and/or any combination of these. Using other terminology, processor 504 and transceiver 502 together may be considered as a wireless transmitter/receiver system, for example.

In addition, referring to FIG. 5, a controller (or processor) 508 may execute software and instructions, and may provide overall control for the station 500, and may provide control for other systems not shown in FIG. 5, such as controlling input/output devices (e.g., display, keypad), and/or may execute software for one or more applications that may be provided on wireless station 500, such as, for example, an email program, audio/video applications, a word processor, a Voice over IP application, or other application or software.

In addition, a storage medium may be provided that includes stored instructions, which when executed by a controller or processor may result in the processor 504, or other controller or processor, performing one or more of the functions or tasks described above.

Implementations of the various techniques described herein may be implemented in digital electronic circuitry, or in computer hardware, firmware, software, or in combinations of them. Implementations may implemented as a computer program product, i.e., a computer program tangibly embodied in an information carrier, e.g., in a machine-readable storage device or in a propagated signal, for execution by, or to control the operation of, a data processing apparatus, e.g., a programmable processor, a computer, or multiple computers. A computer program, such as the computer program(s) described above, can be written in any form of programming language, including compiled or interpreted languages, and can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a communication network.

Method steps may be performed by one or more programmable processors executing a computer program to perform functions by operating on input data and generating output. Method steps also may be performed by, and an apparatus may be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. Elements of a computer may include at least one processor for executing instructions and one or more memory devices for storing instructions and data. Generally, a computer also may include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory may be supplemented by, or incorporated in, special purpose logic circuitry.

To provide for interaction with a user, implementations may be implemented on a computer having a display device, e.g., a cathode ray tube (CRT) or liquid crystal display (LCD) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Implementations may be implemented in a computing system that includes a back-end component, e.g., as a data server, or that includes a middleware component, e.g., an application server, or that includes a front-end component, e.g., a client computer having a graphical user interface or a Web browser through which a user can interact with an implementation, or any combination of such back-end, middleware, or front-end components. Components may be interconnected by any form or medium of digital data communication, e.g., a communication network. Examples of communication networks include a local area network (LAN) and a wide area network (WAN), e.g., the Internet.

While certain features of the described implementations have been illustrated as described herein, many modifications, substitutions, changes and equivalents will now occur to those skilled in the art. It is, therefore, to be understood that the appended claims are intended to cover all such modifications and changes as fall within the true spirit of the various embodiments.

What is claimed is:

1. A method comprising:
   sending, by a first base station (BS), a data rate test notification to one or more neighbor BSs;
   performing, by the first BS, a data rate test between the first BS and a core network;
   receiving, by the first BS, a data rate reply message from one or more neighbor BSs indicating whether or not the data rate test caused a decrease in a data rate available to the neighbor BS during the data rate test compared to an initial data rate available to the neighbor BS before the data rate test; and
   reducing, by the first BS, an amount of resources available to the first BS for allocation to one or more bearers if the data rate reply message indicates that the data rate test caused a decrease in the data rate available to the neighbor BS.

2. The method of claim 1 wherein the sending comprises sending, by the first base station (BS), the data rate test notification to one or more neighbor BSs in response to detecting a re-establishment of a failed interface between the first BS and the core network (first B S-core network interface).

3. The method of claim 2 wherein the re-established first B S-core network interface is re-established over a physical path that shares one or more network resources with an interface between a second BS and the core network or between the first BS and the second BS, the one or more neighbor BSs including the second BS.

4. The method of claim 2 wherein the sending, by a first base station (BS), a data rate test notification comprises:
   detecting, by a first base station (BS), a failure of the first B S-core network interface;
   determining that the failed first BS-core network interface has been re-established, the re-established first B S-core network interface being re-established over a physical path that shares one or more network resources with an interface between a second BS and the core network, the neighbor BSs including the second BS; and
   sending, by the first BS, the data rate test notification to the one or more neighbor BSs in response to the determining that the first BS-core network interface has been re-established.

5. The method of claim 1 wherein the data rate test notification identifies a time period for the data rate test to be performed.

6. The method of claim 1 wherein the data rate reply message from one or more neighbor BSs includes a data rate reduction field that indicates a data rate that should be subtracted from the amount of resources available to the first BS to allocate to one or more bearers.

7. The method of claim 1 and further comprising sending, by the first BS to one or more neighbor BSs, a data rate test results message to report results of the data rate test, wherein the data rate test is performed by the first BS between the sending of the one or more data rate test notifications and the sending of the data rate test results report.

8. The method of claim 1 and further comprising sending, by the first BS to one or more neighbor BSs, a data rate test results message to report results of the data rate test, wherein the data rate reply message from one or more neighbor BSs includes an allocated data rate for the first BS to allocate to guaranteed bit rate (GBR) bearers, the allocated data rate including at least one of:
   a first data rate indicated in the data rate test results message that identifies a data rate detected for the data rate test performed between the first BS and the core network if the data rate test did not cause a decrease in the data rate available to the neighbor BS; or
   a second data rate that is less than the data rate indicated in the data rate test results message if the data rate test caused a decrease in the data rate available to the neighbor BS.

9. A computer program product, the computer program product comprising a non-transitory computer-readable storage medium and storing executable code that, when executed by at least one data processing apparatus, is configured to cause the at least one data processing apparatus to perform a method of claim 1.

10. The method of claim 1, wherein:
   the data rate test notification identifies a time period for the data rate test;
   the data rate test is performed during the identified time period; and
   the data rate test is based on a size of a test file and a time to transmit the test file to the core network.

11. The method of claim 1, wherein the performing, by the first BS, the data rate test between the first BS and the core network comprises stressing an interface between the BS and the core network.

12. The method of claim 1, wherein the performing, by the first BS, the data rate test between the first BS and the core network comprises sending a test file to a gateway within the core network and measuring a transmission time of the test file.

13. An apparatus comprising at least one processor and at least one memory including computer instructions, when executed by the at least one processor, cause the apparatus to:
   send, by a first base station (BS), a data rate test notification to one or more neighbor BSs;
   perform, by the first BS, a data rate test between the first BS and a core network;
   receive, by the first BS, a data rate reply message from one or more neighbor BSs indicating whether or not the data rate test caused a decrease in a data rate available to the neighbor BS during the data rate test compared to a data rate available to the neighbor BS before the data rate test; and
   reduce, by the first BS, an amount of resources available to the first BS for allocation to one or more bearers if the data rate reply message indicates that the data rate test caused a decrease in the data rate available to the neighbor BS.

14. A method comprising:
   receiving, by a second base station (BS), a data rate test notification from a first BS indicating that a data rate test will be performed between the first BS and a core network;
   comparing a data rate available at the second BS before the data rate test to a data rate available at the second BS during the data rate test;
   determining, by the second BS based on comparing the data rate, whether the data rate test performed by the first BS caused a decrease in a data rate available for allocation by the second BS; and
   sending, by the second BS, a data rate reply message to the first BS indicating whether or not the data rate test caused a decrease in the data rate available to the second BS.

15. The method of claim 14 wherein the receiving comprises receiving, by a second base station (BS), a data rate test notification from a first BS indicating that a data rate test will be performed over an interface between the first BS and a core network, wherein a physical path of the interface between the first BS and the core network shares one or more network resources with a physical path for an interface between the second BS and the core network.

16. The method of claim 14 and further comprising receiving, by the second BS, a data rate test results message from the first BS.

17. The method of claim 16 wherein the data rate reply message comprises an allocated or suggested data rate for the first BS to allocate to guaranteed bit rate (GBR) bearers, the allocated or suggested data rate including at least one of:
   a first data rate indicated in the data rate test results message that identifies a data rate detected for the data rate test performed between the first BS and the core network if the data rate test did not cause a decrease in the data rate available to the second BS; or a second data rate that is less than the data rate indicated in the data rate test results message if the data rate test caused a decrease in the data rate available to the second BS.

18. The method of claim 14 wherein the data rate reply message comprises a data rate reduction field that indicates a data rate that should be subtracted from an amount of resources available to the first BS for allocation.

19. A computer program product, the computer program product comprising a non-transitory computer-readable storage medium and storing executable code that, when executed by at least one data processing apparatus, is configured to cause the at least one data processing apparatus to perform a method of claim 14.

20. An apparatus comprising at least one processor and at least one memory including computer instructions, when executed by the at least one processor, cause the apparatus to:

receive, by a second base station (BS), a data rate test notification from a first BS indicating that a data rate test will be performed between the first BS and a core network;

comparing a data rate available at the second BS before the data rate test to a data rate available at the second BS during the data rate test;

determine, by the second BS based on comparing the data rate, whether the data rate test performed by the first BS caused a decrease in a data rate available for allocation by the second BS; and send, by the second BS, a data rate reply message to the first BS indicating whether or not the data rate test caused a decrease in the data rate available to the second BS.

* * * * *

UNITED STATES PATENT AND TRADEMARK OFFICE
CERTIFICATE OF CORRECTION

PATENT NO.         : 10,356,686 B2
APPLICATION NO.    : 15/028211
DATED              : July 16, 2019
INVENTOR(S)        : Henri Markus Koskinen Page 1 of 1

It is certified that error appears in the above-identified patent and that said Letters Patent is hereby corrected as shown below:

In the Claims

In Claim 2, Column 13, Line 5, delete "B S-core" and insert -- BS-core --, therefor.

In Claim 3, Column 13, Line 8, delete "B S-core" and insert -- BS-core --, therefor.

In Claim 4, Column 13, Line 17, delete "B S-core" and insert -- BS-core --, therefor.

In Claim 4, Column 13, Lines 19-20, delete "B S-core" and insert -- BS-core --, therefor.

Signed and Sealed this
Twenty-fifth Day of May, 2021

Drew Hirshfeld
*Performing the Functions and Duties of the*
*Under Secretary of Commerce for Intellectual Property and*
*Director of the United States Patent and Trademark Office*